United States Patent
Arnstein et al.

(10) Patent No.: US 11,243,097 B2
(45) Date of Patent: Feb. 8, 2022

(54) ROTARY ENCODER AND METHOD FOR MANUFACTURING A ROTARY ENCODER

(71) Applicant: LEINE & LINDE AB, Strängnäs (SE)

(72) Inventors: Richard Arnstein, Strängnäs (SE); Per Andréason, Strängnäs (SE)

(73) Assignee: LEINE & LINDE AB, Strängnäs (SE)

( * ) Notice: Subject to any disclaimer, the term of this patent is extended or adjusted under 35 U.S.C. 154(b) by 119 days.

(21) Appl. No.: 16/585,918

(22) Filed: Sep. 27, 2019

(65) Prior Publication Data

US 2020/0103257 A1 Apr. 2, 2020

(30) Foreign Application Priority Data

Sep. 27, 2018 (SE) .................................. 1851158-4

(51) Int. Cl.
*G01D 5/347* (2006.01)
*G01D 5/245* (2006.01)
*G01D 11/24* (2006.01)
*G02B 6/42* (2006.01)

(52) U.S. Cl.
CPC ......... *G01D 5/3473* (2013.01); *G01D 5/2458* (2013.01); *G01D 5/34715* (2013.01); *G01D 11/245* (2013.01); *G02B 6/4277* (2013.01)

(58) Field of Classification Search
CPC .. G01D 5/3473; G01D 5/347; G01D 5/34707; G01D 5/34715; G01D 5/34738; G01D 5/2458; G01D 5/245; G01D 11/245; G01D 5/2451; G01D 5/2454; G02B 6/4277
See application file for complete search history.

(56) References Cited

U.S. PATENT DOCUMENTS

| | | | |
|---|---|---|---|
| 5,155,401 A | 10/1992 | Kanaya et al. | |
| 5,920,134 A | 7/1999 | Mayer et al. | |
| 5,982,253 A * | 11/1999 | Perrin ................... | H01R 13/719 333/182 |
| 8,497,468 B2 | 7/2013 | Setbacken et al. | |
| 2005/0168187 A1 | 8/2005 | Uchiyama et al. | |
| 2008/0001074 A1* | 1/2008 | Fleissner .............. | G01D 11/245 250/231.13 |
| 2008/0142694 A1* | 6/2008 | Rhodes .................. | G01D 11/24 250/231.13 |
| 2010/0133928 A1* | 6/2010 | Harata ................... | H02K 1/187 310/43 |
| 2010/0134997 A1 | 6/2010 | Heim | |
| 2010/0148044 A1* | 6/2010 | Satone ................. | G01D 11/245 250/231.13 |

(Continued)

FOREIGN PATENT DOCUMENTS

EP 3355032 A1 8/2018

OTHER PUBLICATIONS

Extended Search Report issued from the European Patent Office to corresponding EP Application No. 19199913.5 dated Jan. 22, 2020.

*Primary Examiner* — John R Lee
(74) *Attorney, Agent, or Firm* — Carter DeLuca & Farrell LLP

(57) ABSTRACT

A rotary encoder includes a rotor, a stator, and a casting compound. The casting compound has a first surface facing the stator. The first surface has a first predetermined shape and is fixed in relation to the stator. The casting compound has a second surface facing away from the stator, the second surface having a second predetermined shape.

20 Claims, 5 Drawing Sheets

(56) References Cited

U.S. PATENT DOCUMENTS

| | | | |
|---|---|---|---|
| 2010/0176672 A1* | 7/2010 | Abe | H02K 5/225 |
| | | | 310/71 |
| 2011/0083834 A1* | 4/2011 | Braun | H02K 15/14 |
| | | | 165/170 |
| 2011/0181221 A1 | 7/2011 | Asahi et al. | |
| 2012/0169154 A1* | 7/2012 | Curodeau | B60L 15/20 |
| | | | 310/43 |
| 2012/0169325 A1 | 7/2012 | Iwahashi | |
| 2014/0117744 A1* | 5/2014 | Vogler | B60K 7/0007 |
| | | | 301/6.5 |
| 2014/0367559 A1 | 12/2014 | Yoshizawa | |
| 2015/0303764 A1* | 10/2015 | Hosek | H02K 11/21 |
| | | | 310/68 B |
| 2015/0372544 A1* | 12/2015 | Iwasaki | H02K 1/18 |
| | | | 310/43 |
| 2015/0380992 A1* | 12/2015 | Enomoto | H02K 1/182 |
| | | | 310/43 |
| 2016/0013699 A1* | 1/2016 | Yabe | H02K 5/24 |
| | | | 310/43 |
| 2016/0241105 A1* | 8/2016 | Moore | H02K 11/21 |
| 2016/0261164 A1* | 9/2016 | Urabe | H02K 29/08 |
| 2017/0126108 A1* | 5/2017 | Tokoi | H02K 1/146 |
| 2017/0219382 A1* | 8/2017 | Ausserlechner | G01R 33/0047 |
| 2018/0019633 A1* | 1/2018 | Kitaji | H02K 5/08 |
| 2018/0102684 A1* | 4/2018 | Hosek | H02K 11/21 |
| 2018/0220533 A1* | 8/2018 | Rissing | G01D 5/24 |
| 2018/0248440 A1* | 8/2018 | Yamashita | H02K 5/22 |
| 2019/0165626 A1* | 5/2019 | Amaya | H02K 7/003 |
| 2019/0238015 A1* | 8/2019 | Bernreuther | H02K 1/276 |
| 2019/0280552 A1* | 9/2019 | Kuratani | H02K 5/124 |
| 2019/0305628 A1* | 10/2019 | Yamazaki | H02K 1/146 |
| 2020/0103257 A1* | 4/2020 | Arnstein | G01D 5/24433 |
| 2020/0119621 A1* | 4/2020 | Takahashi | H02K 5/18 |
| 2020/0304003 A1* | 9/2020 | Arnstein | H02K 24/00 |

* cited by examiner

ROTARY ENCODER AND METHOD FOR MANUFACTURING A ROTARY ENCODER

CROSS-REFERENCE TO RELATED APPLICATIONS

The present application claims priority to Application No. 1851158-4, filed in the Swedish Patent and Registration Office on Sep. 27, 2018, which is expressly incorporated herein in its entirety by reference thereto.

FIELD OF THE INVENTION

The present invention relates to rotary encoders and methods for manufacturing rotary encoders.

BACKGROUND INFORMATION

Rotary encoders are used in industry for position and speed monitoring and are typically mounted on a shaft of a motor or a gearbox. Mechanical stress, primarily due to vibrations from the engine, is the main reason for the rotary encoder malfunction, which thereby generates unplanned stops during operational use.

The size of the rotary encoder is often a limiting factor in many applications, and end users typically strive for having as small dimensions of the rotary encoder as possible. This places constraints on how robust a rotary encoder can be designed, since choice of critical components such as ball-bearings must be adapted to a limited volume rather than the demands put on the rotary encoder in the environment for which it is intended to be used operationally.

SUMMARY

Example embodiments of the present invention provide a rotary encoder, which mitigates, alleviates, or eliminates one or more of the above-identified deficiencies and disadvantages singly or in any combination.

According to an example embodiment of the present invention, a rotary encoder includes a rotor, a stator, and a casting compound. The casting compound has a first surface facing the stator. The first surface has a first predetermined shape and is fixed in relation to the stator. The casting compound further has a second surface facing away from the stator. The second surface has a second predetermined shape.

By using a casting compound, a homogenous body at least partially embedding and fixing spatial relations of components of the rotary encoder with respect to each other is obtained. The homogenous casting compound body reduces the need for dedicated fastening components, such as nuts and bolts, to fix the stator with respect to a housing holding the rotor and stator (as is typically done in conventional systems). The casting compound body thereby reduces the influence of vibrations, since the use of fastening components is removed. The casting compound further disperses the vibrational energy over a greater volume. The casting compound also prevents embedded elements, such as electrostatic charge/discharge shielding, from vibrating. The casting compound thereby provides for use of a greater range of components that are sensitive to vibrations, e.g. a thin, metallic mesh for electromagnetic radiation shielding to/from the rotary encoder.

Another technical effect is that a greater portion of the internal volume spanned by an external geometry of the rotary encoder can be used for components of the rotor and/or stator compared to conventional rotary encoders. A further technical effect is thus that larger ball-bearings, in particular ball-bearings having a greater dimension, can be used within a corresponding internal volume of a rotary encoder. A yet further technical effect is that more circuitry can be enclosed within the internal volume, as compared to conventional systems, which provides for extended functionality of the rotary encoder, e.g. by being able to stack more (printed) circuit boards on top of each other within the internal volume.

An additional technical effect of the casting compound is that a wider range of materials, in particular different types of plastics, may be used instead of metal for defining a body of the rotary encoder. The casting compound thereby provides for the use of materials that are both lighter and less expensive than metals. The casting compound also provides greater flexibility, and easy of manufacturing, of the shape of the body. A mold for the casting compound may, for example, be 3D-printed according to customer specifications.

According to some aspects, the rotary encoder includes a first housing having a cavity, in which the cavity is fixed in relation to the second surface. The first housing provides for merging a mold for the casting compound (or part of the mold) with the casting compound, e.g., when casting compound is poured into the cavity of the first housing and allowed to cure, the (cured) casting compound attaches itself to the walls of the cavity. The use of a first housing thereby provides for a flexible manner of manufacturing the rotary encoder. The first housing furthers provides for an easy manner of introducing additional functionality to the rotary encoder, e.g., by coating the walls of the cavity, i.e., the inside of the housing, by a thin metallic layer or a metallic paint for electromagnetic and/or electrostatic shielding.

According to some aspects, the rotary encoder further includes a second housing at least partially enclosing the stator and fixed in relation to the stator. The second housing is arranged between the stator and the casting compound so that the stator is fixed in relation to the first surface of the casting compound via the second housing. Fixing the stator with respect to the casting compound via the second housing provides for manufacturing of rotary encoders where the rotor and stator have been assembled and arranged within a housing prior to the addition of casting compound.

According to some aspects, the rotary encoder further includes a set of ball-bearings arranged to permit the rotor to rotate about an axis with respect to the stator. One of the major advantages of the rotary encoder described herein is its ability to make better use of the volume spanned by the rotary encoder. This allows for the use of larger ball-bearings in the rotary encode. The ball-bearings thereby interact synergistically with the casting compound in that the casting compound allows for the use of larger and more stress-tolerant ball-bearings, and the (larger) ball-bearings in turn provide a (previously unattainable) rotation mechanism for the rotor to rotate with respect to the stator. Thus, a lighter and potentially smaller, but at the same time more mechanically robust, rotary encoder may be achieved.

According to some aspects, the rotary encoder further includes a rotation-prevention device configured so as to prevent the stator from rotating with respect to an external device when the rotation-prevention device is fixed to the external device. The rotation-prevention device facilitates installation of the rotary encoder. In particular, the rotation-prevention device provides a mechanism for preventing the stator from rotating with respect to a system in which it has been installed.

The rotation-prevention device may be configured to provide efficient transfer of torque to/from the rotary encoder in a number of manners. For instance, according to some aspects, the rotation-prevention device includes a torque bracket. The torque bracket is configured to fix the stator with respect an external device when the torque bracket is fix to the external device. Torque brackets allow for mounting the rotary encoder using standard components such as nuts and bolts.

According to some aspects, the rotation-prevention device includes an elongated member. The elongated member is arranged at a distance from an axis about which the rotor is configured to rotate. The elongated member is arranged to extend outwardly from the rotary encoder. The elongated member provides an attachment site which, due to the offset of the elongated member from the axis, provides for transfer of torque to and from an external device attached to the elongated member. By attaching to the elongated member and providing counter-torque to torque caused by the rotary encoder, the stator of the rotary encoder can be prevented from rotating with respect to an external device providing counter-torque by using a lever arm provided for by attaching to the elongated member.

According to some aspects, the rotary encoder further includes a recess. The recess is arranged so as to prevent the stator from rotating with respect to an external device when an elongated member fixated to the external device is arranged in the recess. The recess is arranged at a distance from an axis about which the rotor is configured to rotate. The recess provides counter-torque to act on the rotary encoder in response to torque caused by the rotary encoder. The principle is analogous to that of the elongated member; by inserting an elongated member into the recess and keeping the elongated member fixed, the stator of the rotary encoder can be prevented from rotating with respect to the inserted elongated member.

The rotary encoder may further be configured for electromagnetic compatibility scenarios. The casting compound is ideal for fixing and protecting fragile EMC components, such as various types of shielding, from vibrations. According to some aspects, the rotary encoder further includes electrostatic discharge, ESD, shielding arranged to shield the rotary encoder from electrostatic charge and/or discharge. According to some aspects, the rotary encoder further includes electromagnetic shielding arranged to prevent electromagnetic radiation to and/or from the rotary encoder exceeding a predetermined threshold. According to some aspects, the rotary encoder is configured to function without degradation in the presence of a predetermined electromagnetic disturbance. In other words, according to some aspects, the rotary encoder is configured to be electromagnetically immune to a predetermined radio frequency interference.

According to some aspects, the rotary encoder further includes a set of sealing components arranged at the rotary encoder. The set of sealing components is arranged to seal the rotor from the casting compound.

According to some aspects, the rotary encoder further includes a set of spacers arranged at the rotary encoder. The set of spacers is configured to fix a relative position between two or more components of the rotary encoder. The sealing components may also act as spacers, and vice versa. In other words, the sealing components and spacers may serve dual functions. By fixing the relative position between the two or more components, the spacers facilitate manufacturing of the rotary encoder, as the two or more components may be embedded in the compound at exact, desired locations.

According to an example embodiment of the present invention, a method for manufacturing a rotary encoder, having a rotor and a stator, includes arranging the stator in an internal space of a housing. The method further includes filling a residual space of the internal space, between the stator and the housing, with a casting compound. The casting compound has a first surface facing the stator. The first surface has a first predetermined shape and is fixed in relation to the stator. The casting compound further has a second surface facing away from the stator. The second surface has a second shape determined by the internal space of the housing.

According to some aspects, the method also includes arranging a set of sealing components at the rotary encoder. The set of sealing components is arranged to seal the rotor from the casting compound.

According to some aspects, the method further includes arranging a set of spacers at the rotary encoder. The set of spacers is configured to fix a relative position between two or more components of the rotary encoder.

According to some aspects, the method further includes arranging a rotation-prevention device at the rotary encoder. The rotation-prevention device is configured to fix the stator with respect an external device when the rotation-prevention device is fix to the external device.

The method produces a rotary encoder as described above and thereby provides all the associated technical effects and advantages of the rotary encoder.

Further features and aspects of example embodiments of the present invention are described in more detail below with reference to the appended Figures.

DETAILED DESCRIPTION

Example embodiments of a rotary encoder and of a method of manufacturing a rotary encoder are described below. It should be understood that the rotary encoder and method may be realized in many different forms and that the following description should not be considered limiting.

Moreover, the terminology used herein is for the purpose of describing particular aspects of the rotary encoder and method and should also not be considered limiting. As used herein, the singular forms "a", "an" and "the" are intended to include the plural forms as well, unless the context clearly indicates otherwise.

Figure 1:
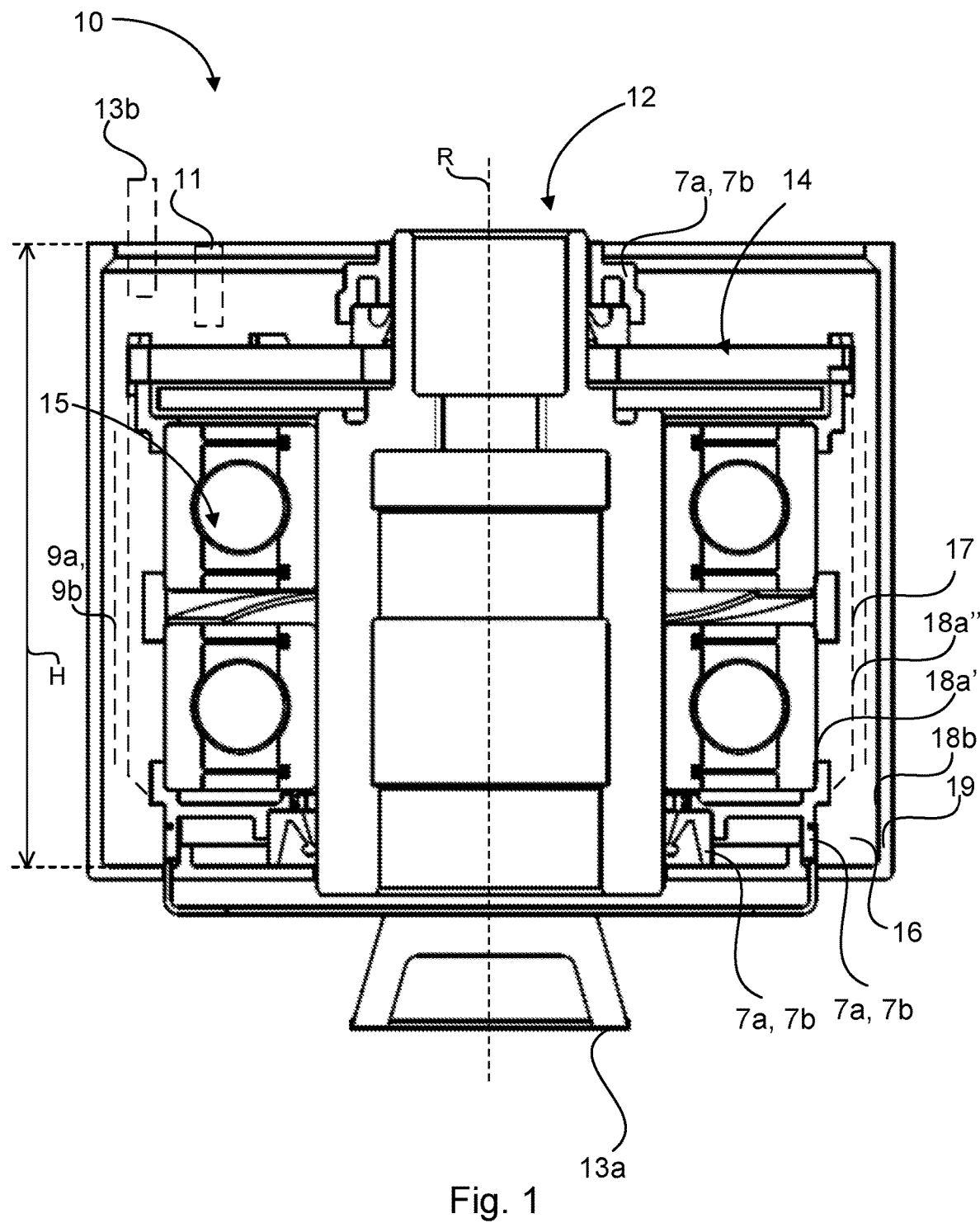
FIG. 1 is a cross-sectional view of a rotary encoder.

FIG. 1 is a cross-sectional view of a rotary encoder 10 according to an example embodiment of the present invention. The rotary encoder 10 includes a rotor 12 and a stator 14. The rotary encoder 10 operates by being configured to detect relative rotation of the rotor 12 and the stator 14. The rotation of the rotor with respect to the stator may be detected using any technology capable of detecting such changes. Examples of such technologies include capacitive, optical, inductive, and magnetic detection. The rotary encoder may be configured as an incremental and/or an absolute rotary encoder. The terms rotor and stator may refer to single components as well as aggregates serving a common function of rotor or stator.

In conventional systems, the rotor and stator of a rotary encoder are arranged in a metallic housing, and the housing would then be mounted in a system of an end user. The stator would be fixed by mechanical fastening mechanism(s), such as nuts and bolts, to the metallic housing in which the rotor and stator are arranged. During operational use, many rotary encoders are subject to significant stress, typically in the form of vibrations. In order to hold the rotor and stator steady within the housing, the mechanical fastening mechanism will therefore typically take up a significant portion of the internal space of the housing, thereby reducing the size of the rotor and stator that may be arranged within the internal space of the housing, or conversely, for a given size of rotor and stator, a conventional rotary encoder would need a correspondingly sized housing able to also fit the necessary mechanical fastening mechanisms. Additionally, the mechanical fastening mechanisms are often a point of failure during operational use of such rotary encoders.

The protective metallic housing and the fastening mechanisms can be dispensed with by the use of a casting compound. Instead of fastening the rotor 12 and stator 14 to a metallic housing and fixing the stator to the metallic housing using mechanical fasteners, a rotor-stator arrangement may be arranged in an internal space of a housing (serving as a mold), and filling the residual space of the internal space, between the rotary encoder and the housing, with the casting compound.

Thus, the rotary encoder 10 further includes a casting compound 16. The casting compound 16 has a first surface 18a', 18a" facing the stator. The first surface has a first predetermined shape and is fixed in relation to the stator. The casting compound 16 further has a second surface 18b facing away from the stator. The second surface has a second predetermined shape. The rotary encoder 10 is configured such that the casting compound 16 does not hinder the rotation of the rotor 12 with respect to the stator 14. The second surface 18b may span a volume that includes the entire stator. According to some aspects, the second surface 18b spans a volume that includes at least part of the rotor 12. For instance, the casting compound 16 may be arranged radially distributed about an axis of rotation R of the rotor, along a longitudinal extension H coinciding with the longitudinal extension of the stator 14 and at least part of the rotor 12, as illustrated in FIG. 1. In the illustrated example, the longitudinal extension H extends beyond the longitudinal extension of the stator. Sealing components 7a and spacers 7b may then be used to prevent the casting compound 16 from attaching to the rotor 12. According to some further aspects, the second surface 18b spans a volume that includes the entire rotor 12. The casting compound may thereby embed at least part of the electronic circuitry of the rotary encoder.

In the above manufacturing example, the shape of the mold in which the casting compound 16 is cured would, at least initially, determine the predetermined shape of the second surface 18b. The predetermined shape of the second surface 18b may subsequently be changed further.

By eliminating the need for the metallic housing and mechanical fasteners, associated points of failure are also eliminated. The rotary encoder 10 is therefore more robust with respect to vibrations. The casting compound further provides for an improved pressure distribution within the rotary encoder. The casting compound effectively prevents embedded components from gradual changes of position due to vibrations.

The use of a casting compound extends the range of materials that may be used for the body of the rotary encoder. In particular, the casting compound may include a plastic material, such as polyurethane. By having a portion of the body of the rotary encoder made of a light material such as plastic, instead of metal as for conventional rotary encoders, the weight of the rotary encoder 10 can be greatly reduced. This significantly reduces the sensitivity to vibrations. The material of the casting compound may further have the advantage of being inexpensive, e.g., with respect to metal or metallic components. The use of a casting compound further facilitates synergistic effects such as efficient heat transfer, electrical isolation and environmental protection, e.g., preventing water from entering the rotary encoder.

It may be desirable to provide a cover, such as a housing, for the second surface 18b of the casting compound. Thus, according to some aspects, the rotary encoder 10 further includes a first housing 19 having a cavity, in which the cavity is fixed in relation to the second surface. The first housing 19 thereby protects the second surface 18b. The first housing may have a wall thickness less than a few millimeters, e.g., less than two millimeters or less than one millimeter. The first housing 19 may thereby provide protection for the second surface 18b, e.g., against chemicals, while taking up an insignificant amount of volume and adding an insignificant amount of weight to the rotary encoder. The first housing may include an end-user interface. The end-user interface facilitates integration of the rotary encoder into a system of the end-user.

The first housing 19 may also facilitate the manufacturing process. One manner of providing the first housing is to let the first housing act as a mold into which casting compound is filled when added to the rotor-stator arrangement of the rotary encoder attach to the second surface 18b. The first housing may further facilitate the manufacturing process by assisting with the arrangement of additional elements into the rotary encoder. For instance, by coating the inside of the first housing or introduce components on the inside of the first housing, the coating and/or the components on the inside of the first housing will be embedded between the casting compound and the first housing when the casting compound is introduced into the first housing.

It is further to be understood that the first surface having a first predetermined shape and being fixed in relation to the stator does not necessarily mean that the casting compound is directly attached to the stator. The casting compound may be fixedly connected to the stator via one or more intermediary structures. For instance, it is common to join the rotor and stator within an at least partially enclosing housing to which to stator is fixed. By connecting the casting compound to such housing, the casting compound will be fixed to the stator, and vice versa, via the at least partially enclosing housing. Thus, according to some aspects, the rotary encoder 10 further includes a second housing 17 at least partially enclosing the stator and fixed in relation to the stator. The second housing 17 is arranged between the stator and the casting compound so that the stator is fixed in relation to the first surface of the casting compound via the second housing. The first surface of the casting compound 18a" may thus include the portion of the casting compound in contact with the second housing.

One of the main strengths of the rotary encoders described herein is the efficient use of available space. With the casting compound eliminating the need for metallic protective housings and mechanical fasteners within the metallic protective housing to fix the stator with respect the metallic protective housing, a greater portion of a volume corresponding to the volume spanned by a given metallic protective housing may be used for the rotor and the stator, and components associated therewith. In particular, rotary encoders as described herein allow for the use of greater ball-bearings compared to conventional rotary encoders. Since rotary encoders typically have strict size requirements, there will be corresponding size restrictions to ball-bearings of the rotary encoders. The size of ball-bearings have a strong relationship with the mechanical tolerances they can exhibit, i.e., the level of mechanical stress, such as vibrations, that they can withstand. Since the rotary encoders hereof allow for larger ball-bearings to be used within a predetermined volume of a rotary encoder, the rotary encoder is more stress tolerant and further provide for the use of ball-bearing based encoders in some cases where ball-bearings were not previously an option due to size restrictions of the conventional rotary encoder prohibiting the use of ball-bearings having sufficiently high degrees of stress tolerance. Thus, according to some aspects, the rotary encoder further includes a set of ball-bearings 15 arranged to permit the rotor to rotate about an axis with respect to the stator.

The rotary encoder may also include components for preventing the casting compound from certain reaching areas. In particular, the rotor must be able to move with respect to the stator. Thus, according to some aspects, the rotary encoder 10 further includes a set of sealing components 7a arranged at the rotary encoder. The set of sealing components is arranged to seal the rotor from the casting compound. The rotary encoder may also include a set of spacers 7b arranged at the rotary encoder. The set of spacers is configured to fix a relative position between two or more components of the rotary encoder. According to some aspects, a sealing component 7a is also configured to act as a spacer 7b.

For operational use of the rotary encoder, it is important to ensure that the stator remains fixed with respect to the system in which the rotary is intended to be used by, e.g., an end user. While this could be done entirely by external mechanisms that are configured to attach to and hold the stator in a fixed position with respect to the (end user) system, the rotary encoder may be configured to facilitate installation of the rotary encoder, in particular to facilitate fixing with respect to the end user system. The rotary encoder may be equipped with a mechanism that facilitates transfer of torque to/from an external device. The rotary encoder may also be configured to receive mechanism(s) by which torque may be transferred to/from an external device.

Thus, according to some aspects, the rotary encoder further includes a rotation-prevention device 13a, 13b configured so as to prevent the stator from rotating with respect to an external device when the rotation-prevention device is fixed to the external device.

For instance, the rotation-prevention device 13a, 13b may include a torque bracket 13a. The torque bracket 13a is configured to fix the stator with respect an external device when the torque bracket is fixed to the external device. The torque bracket 13a may be partially embedded in the casting compound 16. The part(s) of the torque bracket not embedded in the casting compound may thereby be fixed to the external device, and torque may be transferred to/from the external device via the torque bracket, to the casting compound and on to the stator. Torque generated at the stator when the rotor rotates with respect to the stator can thereby be compensated via the torque bracket. The torque bracket may be arranged to transfer torque in a horizontal and/or radial direction. According to some aspects, the torque bracket has an extension in a horizontal and/or radial direction with respect to the axis of rotation of the rotor, whereby torque can be transferred.

According to some aspects, the rotation-prevention device 13a, 13b includes an elongated member 13b. The elongated member is arranged at a distance from an axis about which the rotor is configured to rotate. The elongated member is also arranged to extend outwardly from the rotary encoder. The elongated member may extend outwardly in a horizontal and/or radial direction with respect to the axis of rotation of the rotor. By offsetting the elongated member from the axis about which the rotor is configured to rotate, a lever arm is provided. An external device may thereby attach to the elongated member and exert torque via the elongated member in order to counter any torque that may cause the rotor to rotate. The elongated member may be partially embedded in the casting compound.

According to some aspects, the rotary encoder further includes a recess 11. The recess is arranged at a distance from an axis about which the rotor is configured to rotate. The recess is arranged so as to prevent the stator from rotating with respect to an external device when an elongated member fixed to the external device is arranged in the recess. The operation is similar to that of the elongated member described above. For example, the recess 11 is offset from the axis about which the rotor is configured to rotate in order to provide a lever arm. When an elongated member fixed to an external device is arranged in the recess, torque can be transferred via the inserted elongated member to the cavity and thereby the stator in order to prevent the stator from rotating. The recess 11 may be formed at least partially in the casting compound. The recess may extend in a horizontal and/or radial direction with respect to the axis of rotation of the rotor.

The rotary encoder 10 may also be configured for electromagnetic compatibility, EMC. For instance, according to some aspects, the rotary encoder further includes electrostatic discharge, ESD, shielding 9a arranged to shield the rotary encoder from electrostatic charge and/or discharge. According to some aspects, the casting compound is not electrically conductive. Likewise, according to some aspects, the rotary encoder further includes electromagnetic shielding 9b arranged to prevent electromagnetic radiation to and/or from the rotary encoder exceeding a predetermined threshold. Either of the ESD shielding 9a and the electromagnetic shielding 9b may be at least partially embedded in the casting compound 16. The casting compound may thereby protect the shielding from vibrations, and thereby permit the use of shielding solutions that would otherwise break during operational use of the rotary encoder, e.g., some metallic meshes. Either shielding may be provided in the form of a coating on the second surface 18b of the casting compound and/or on a surface of a first housing 19, if present. The coating may include a metallic paint. According to some aspects, the rotary encoder 10 is configured to function without degradation in the presence of a predetermined electromagnetic disturbance. In other words, according to some aspects, the rotary encoder 10 is configured to be electromagnetically immune to a predetermined radio frequency interference.

In addition to sensing for determination of rotation of the rotor with respect to the stator, the rotary encoder may include auxiliary functions, such as diagnostic functions. The rotary encoder 10 provides more space for circuitry, such as printed circuit boards. Printed circuit boards may be stacked on top of each other in order to provide additional functionality to the rotary encoder 10. For instance, the rotary encoder 10 may further include circuitry for vibrational measurement, overspeed, temperature measurement and/or a wireless communication interface, such as a communication interface configured to communicate using the Bluetooth wireless technology standard. The printed circuit boards may be at least partially embedded in the casting compound 16.

Figure 2:
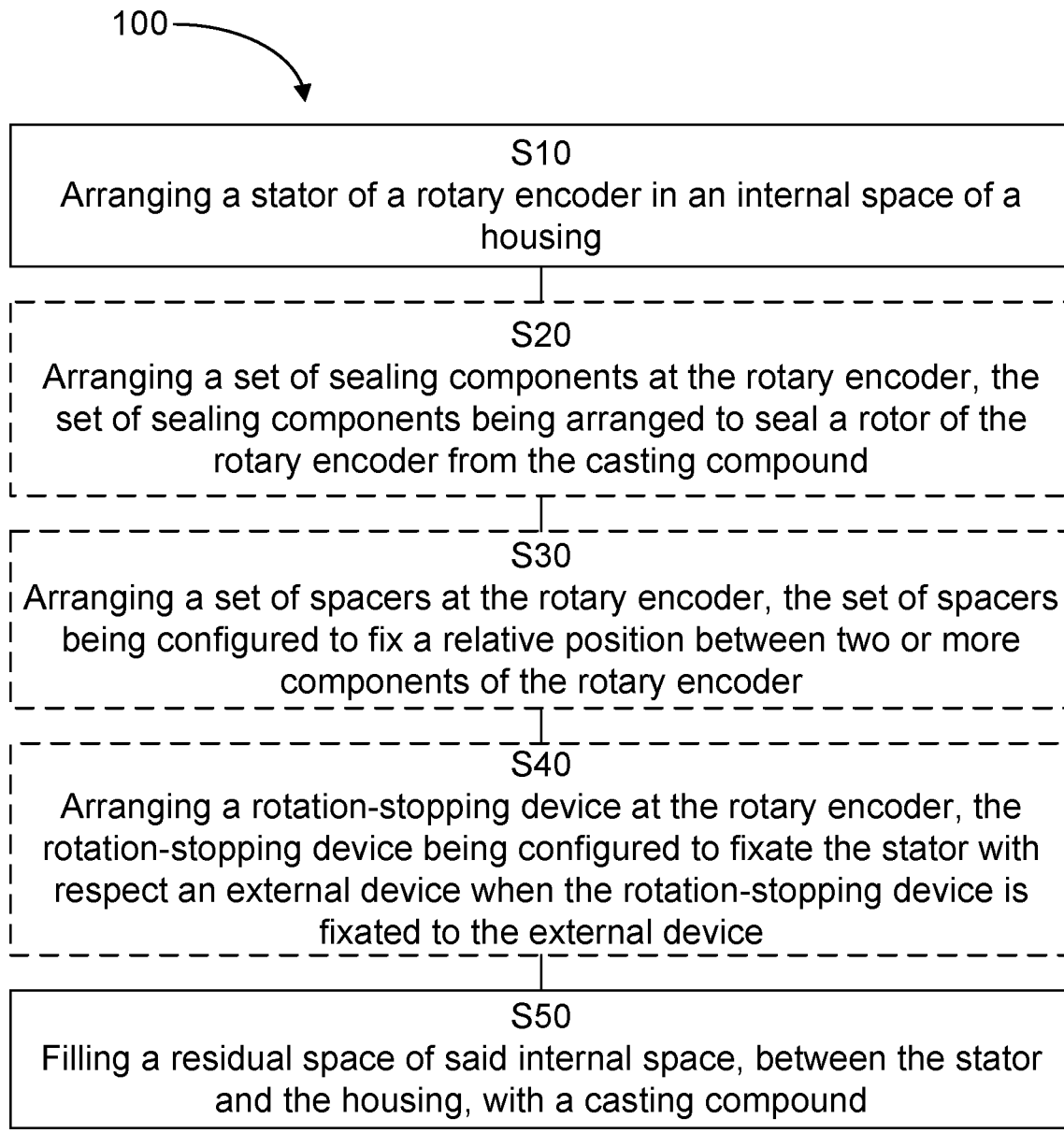
FIG. 2 illustrates a method manufacturing a rotary encoder.

FIG. 2 illustrates a method 100 for manufacturing a rotary encoder, the rotary encoder including a rotor and a stator. The method includes arranging S10 the stator in an internal space of a housing. Arranging S10 the stator in the internal space may include arranging the rotor and the stator assembled into a rotor-stator aggregate configured such that the rotor can rotate relative to the stator, in an internal space of a housing. The method further includes filling S50 a residual space of the internal space, between the stator and the housing, with a casting compound. The casting compound has a first surface facing the stator. The first surface has a first predetermined shape and is fixed in relation to the stator. The casting compound also has a second surface facing away from the stator. The second surface has a second shape determined by the internal space of the housing. A rotary encoder is thereby obtained, with all the associated technical effects and advantages described above. In order to ensure that the rotor is able to rotate freely also after the casting compound has filled the residual space, the rotor may be sealed off from the casting compound. In other words, according to some aspects, the method further includes arranging S20 a set of sealing components at the rotary encoder. The set of sealing components is arranged to seal the rotor from the casting compound. The casting compound may thereby embed at least part of the electronic circuitry of the rotary encoder.

The rotary encoder may further require that certain components are arranged at predetermined spatial arrangements within the rotary encoder, particularly some components that are to be embedded in the casting compound. In order to facilitate obtaining desired spatial relationships, the method may further include arranging S30 a set of spacers at the rotary encoder. The set of spacers is configured to fix a relative position between two or more components of the rotary encoder. Sealing components may simultaneously function as spacers (and vice versa); the steps of arranging S20 sealing components and arranging S30 spacers may thus be performed simultaneously via the dual functions of the sealing components/spacers.

According to some aspects, the method further includes arranging S40 a rotation-prevention device at the rotary encoder. The rotation-prevention device is configured to fix the stator with respect an external device when the rotation-prevention device is fixed to the external device. The rotation-prevention device may include a torque bracket and/or an elongated member, as described in relation to FIG. 1 above. The method may also include arranging, at the rotary encoder, a recess adapted to prevent the stator from rotating with respect to an external device when an elongated member fixed to the external device is arranged in the recess. The recess is arranged at a distance from an axis about which the rotor is configured to rotate.

Figures 6A, 6B:
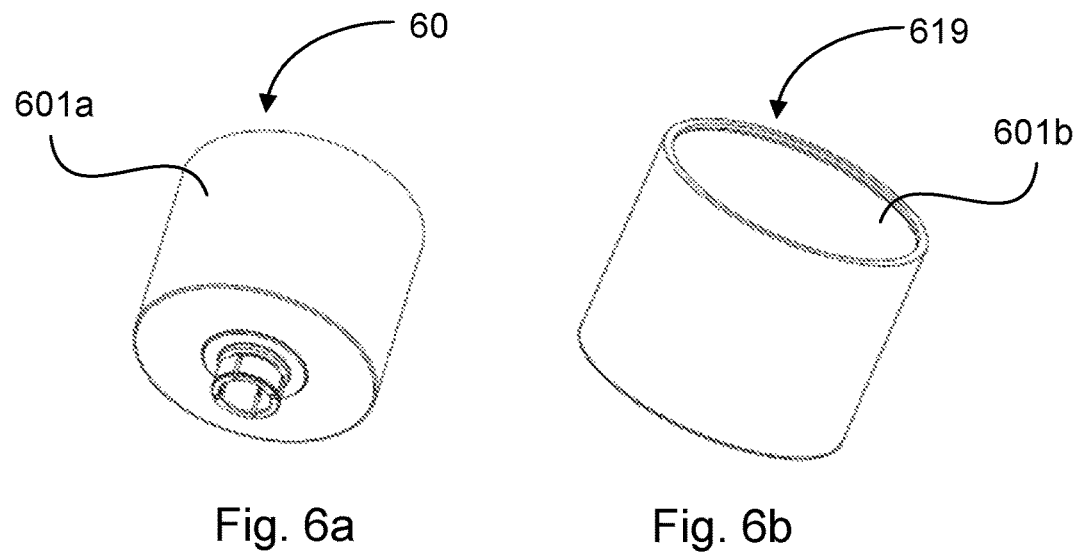
FIGS. 6a and 6b illustrate rotary encoders having different electromagnetic compatibility aspects.

Further features relating to additional functionality, such as extended diagnostics, and/or electromagnetic compatibility as described in relation to FIGS. 1, 6a, and 6b may also be added in separate method steps prior to filling S50 the residual space.

Figure 3:
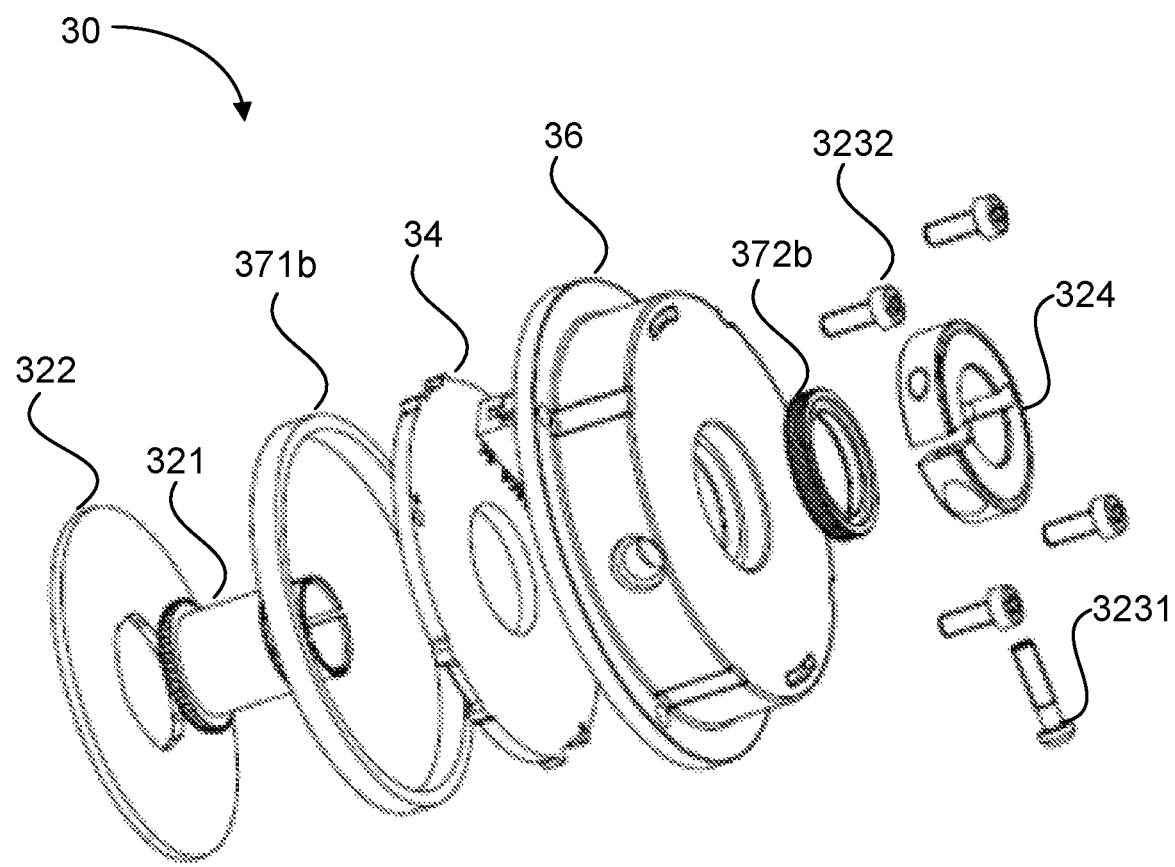
FIG. 3 is an exploded perspective view of a rotary encoder.

FIG. 3 is an exploded perspective view of a rotary encoder 30. The rotary encoder includes a rotor and a stator. The rotor is illustrated as including a shaft 321, which constitutes the central axis about which the rotor is arranged to rotate. The shaft 321 may have a hole extending through a longitudinal direction of the shaft for receiving a second shaft in the hole. The rotor further includes a first disk 322 having a scale for detection of relative rotation between the rotor and the stator. The first disk 322 is mounted at one end of the shaft 321. When the shaft rotates with respect to the stator, rotation measurement circuitry at the stator can detect changes in the scale with respect to the rotation measurement circuitry. For instance, the scale may include inductive, capacitive, and/or magnetic elements configured to cause a corresponding inductive, capacitive, or magnetic signal when the first disk is rotated with respect to the stator. The scale may be part of an optical rotary encoder, in which the rotary encoder is configured to shine a light onto a photodiode through slits in the first disk. Alternatively, a reflective version of an optical rotation measurement arrangement for an optical rotary encoder may be used.

The shaft 321 is maintained in place in a circular opening through the stator by a locking mechanism at the other end of the shaft. In this example, the locking mechanism includes a ring 324, which is fastened to the other end of the shaft by a screw 3231.

The stator 34 includes a second disk. The second disk includes a measurement apparatus configured to detect relative motion of the first and second disks, e.g., by detecting the inductive, capacitive, or magnetic signals. The second disk may include a printed circuit board.

The rotary encoder 30 further includes a casting compound 36. The casting compound 36 has a first surface facing the stator 34. The first surface has a first predetermined shape and is fixed in relation to the stator. In this example, the casting compound embeds the stator with the exception of the side of the second disc facing the first disc. In other words, the first predetermined shape of the casting compound is determined by the shape of the components arranged on the second disk, such as the measurement apparatus. The casting compound 36 also has a second surface facing away from the stator. The second surface has a second predetermined shape, which, in this example, includes a desired external shape of the rotary encoder. Thus, the casting compound may thereby embed at least part of the electronic circuitry of the rotary encoder. The casting compound further encloses at least part of the rotor, here at least part of the 321. The casting compound further includes holes for electric power cables to be attached to electronic circuitry at the second disc, such as the measurement apparatus. The electric power cables may be attached to the electronic circuitry prior to the application of casting compound during a manufacturing process. In this example the casting compound further includes holes through with screws 3232, etc. can be inserted and thereby attach the rotary encoder to an external device. The holes thereby also serve as anti-rotation mechanism in the same manner as the recesses described in relation to FIG. 1 above, with the screws corresponding to the elongated members inserted into the recesses.

A first spacer 371b is arranged at the rotary encoder. The first spacer is configured to maintain a predetermined distance between the first and second disks. According to some aspects, the casting compound further encloses the first disk 322. The rotary encoder also includes a second spacer 372b. The second spacer is arranged between the casting compound and the ring 324 of the locking mechanism. The illustrated rotary encoder may be manufactured by arranging the stator 34 and the first spacer 371*b* in a mold, followed by filling the residual space with the casting compound. The rotary encoder 30 may then be assembled by fastening the rotor to the stator and casting compound by the locking mechanism, as described above.

The illustrated rotary encoder 30 provides a minimalistic example of how the rotary encoder may be implemented. However, the rotary encoder 30 may include any of the technical features illustrated in relations to FIGS. 1 and 2 above and FIGS. 4 to 6*b* below.

Figures 4A, 4B:
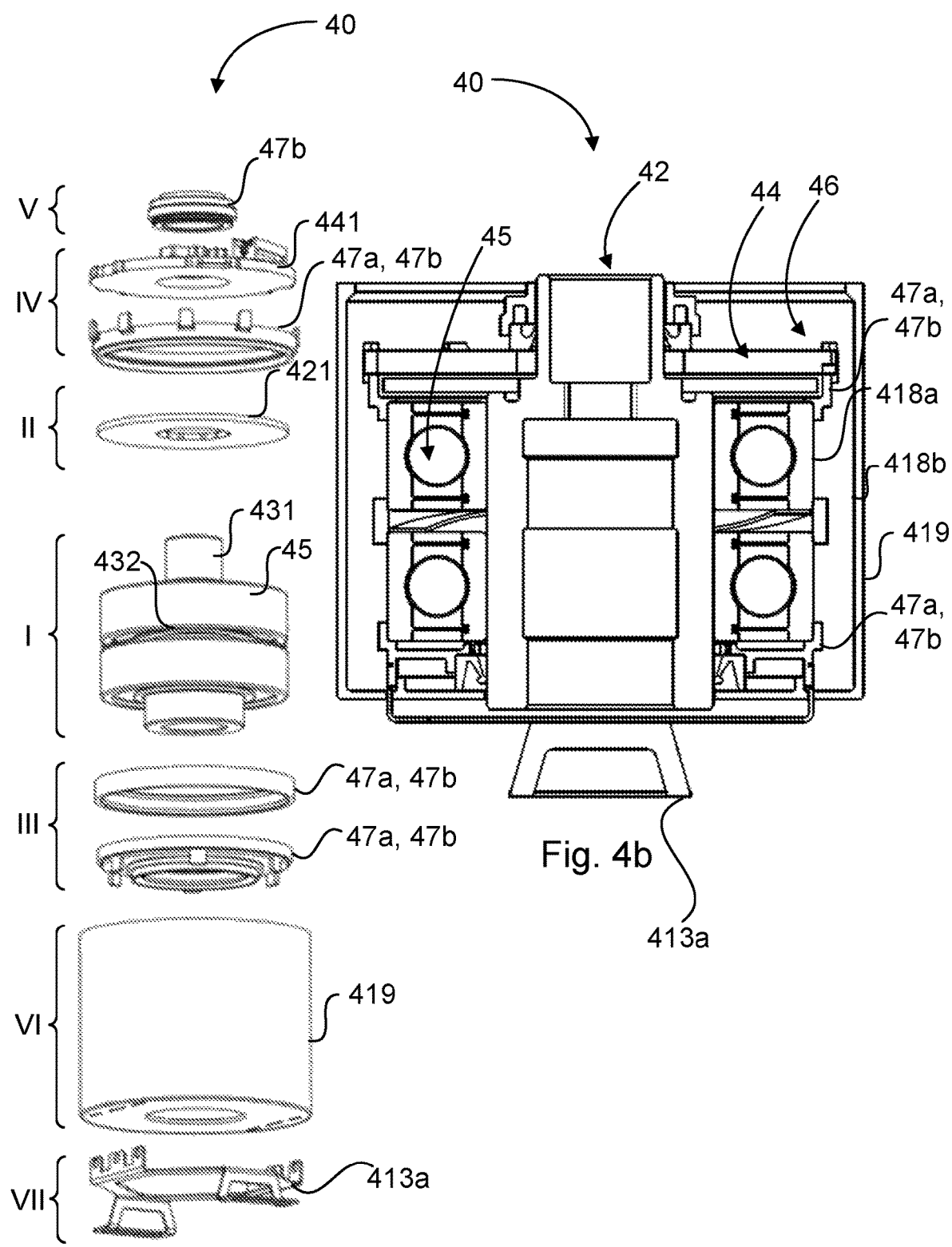
FIGS. 4a and 4b are an exploded perspective view and a cross-sectional view of a rotary encoder, respectively.

FIGS. 4*a* and 4*b* are an exploded perspective view and a cross-sectional view of a rotary encoder 40, respectively. The rotary encoder 40 includes a rotor 42 and a stator 44. The rotary encoder 40 further includes a casting compound 46. The casting compound 46 has a first surface 418*a* facing the stator 44. The first surface has a first predetermined shape and is fixed in relation to the stator. The casting compound further has a second surface 418*b* facing away from the stator. The second surface has a second predetermined shape.

The second surface 418*b* may span a volume that includes the entire stator. According to some aspects, the second surface 418*b* spans a volume that includes at least part of the rotor 42. For instance, the casting compound 46 may be arranged radially distributed about an axis of rotation of the rotor, along a longitudinal extension coinciding with the longitudinal extension of the stator 44 and at least part of the rotor 42. In the illustrated example, the longitudinal extension H extends beyond the longitudinal extension of the stator. Sealing components 47*a* and spacers 47*b* may then be used to prevent the casting compound 46 from attaching to the rotor 42. In the illustrated example, the rotary encoder additionally includes a set of sealing components 47*a* arranged at the rotary encoder. The set of sealing components is arranged to seal the rotor from the casting compound. The rotary encoder further includes a set of spacers 47*b* arranged at the rotary encoder. The set of spacers is configured to fix a relative position between two or more components of the rotary encoder. According to some further aspects, the second surface 418*b* spans a volume that includes the entire rotor 42. Thus, the casting compound may thereby embed at least part of the electronic circuitry of the rotary encoder.

The rotary encoder 40 further includes a first housing 419 having a cavity. In this example, the rotor and the stator are arranged within the cavity of the first housing (except for the ends of the rotor slightly extending beyond the cavity). The cavity is fixed in relation to the second surface 418*b*.

The rotary encoder also includes a pair of ball-bearings 45 arranged to enable the rotor to rotate about an axis with respect to the stator.

The arrangements of the components of the rotary encoder and the resulting first and second surfaces of the casting compound will be described with reference to an exemplary method for manufacturing the rotary encoder. The method includes seven steps. In a first step I, the pair of ball-bearings 45 is provided and pushed onto a shaft 431, forming a ball-bearing-shaft assembly. The shaft may be used to facilitate assembly of the parts of the rotary encoder without necessarily being a part of the rotary encoder. In this example, the shaft is part of the rotor. The pair of ball-bearings may include a spring washer 432 in between the ball-bearings in order to provide a pre-stressing. In a second step II, a coding disk 421 is mounted on the shaft. Alternatively, the coding disk is mount on the ball-bearings, with the shaft as a guiding mechanism, thereby providing for later removal of the shaft if desired. The coding disk provides a coded scale that can be read by corresponding measuring apparatus at the stator. The coding disk thereby permits the measuring apparatus to determine rotation of the rotor with respect to the stator. In a third step III, sealing components 47*a*, which also function as spacers 47*b*, are arranged onto the ball-bearing-shaft assembly. In a fourth step IV, a stator disk 441 including the measuring apparatus is mounted in a spacer 47*a*, 47*b* configured to hold the stator disk at a predetermined distance from the coding disk (when the rotary encoder is assembled). The stator disk and the spacer holding the stator disk are mounted on the ball-bearing-shaft assembly. In a fifth step V, sealing components 47*b* configured to seal the shaft from casting compound is mounted on the shaft. In a sixth step VI, the ball-bearing-shaft assembly resulting from the first to fifth steps is arranged within a first housing 419. A residual space, between the ball-bearing-shaft assembly and the housing, is filled with the casting compound 46. The first surface 418*a* of the casting compound will thus include the surface that attaches to the ball-bearing-shaft assembly. The second surface 418*b* of the casting compound will include the surface that attaches to the first housing. The first to the fifth steps may be performed in any order and divided up in any sub-steps desired, as long as the ball-bearing-shaft assembly is fully assembled before it is arranged in the housing and the casting compound is allowed to fill the residual space in between. The shaft may include a hollow region extending along the longitudinal direction of the shaft for receiving a second shaft in the hollow region. For instance, the shaft may include a hollow cylinder.

At a seventh step VII, which optionally may be performed before the sixth step VI, a rotation-prevention device, e.g., illustrated with a torque bracket 413*a*, is added to the rotary encoder. The torque bracket is partially embedded in the casting compound and is thereby configured so as to prevent the stator from rotating with respect to an external device when the rotation-prevention device is fixed to the external device. In other words, the torque bracket is configured to fix the stator with respect an external device when the torque bracket is fixed to the external device.

Figures 5A, 5B, 5C:
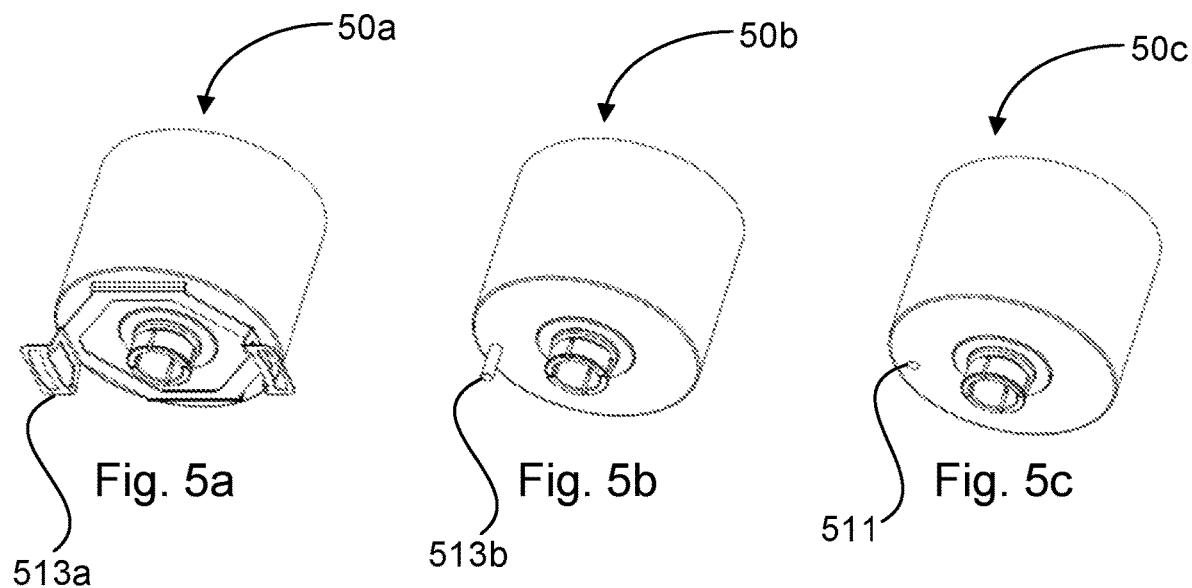
FIGS. 5a to 5c illustrate rotary encoders with different torque transfer mechanisms.

FIGS. 5*a* to 5*c* illustrate rotary encoders 50*a*, 50*b*, 50*c* with different torque transfer mechanisms. By being able to transfer torque to the rotary encoder as in the illustrated examples, the position of the stator can be maintained fixed with respect to an external device providing a counter-torque to the stator via the torque transfer mechanism. FIG. 5*a* illustrates a rotary encoder 50*a* including a torque bracket 513*a*. In the illustrated example, the torque bracket extends outwardly longitudinally along the axis of rotation of the rotor, with a pair of wings for attaching the torque bracket to an external device. The torque bracket facilitates mounting the rotary encoder 50*a* to an external device, thereby making it easier for an end user to install the rotary encoder. When mounted, the torque bracket prevents the stator of the rotary encoder from rotating with respect to the external device. Torque brackets extending outwardly in a radial direction, or any combination of longitudinal and radial directions, are also possible alternatives.

FIG. 5*b* illustrates a rotary encoder 50*b* including an elongated member 513*b*. The elongated member is arranged at a distance from an axis about which the rotor is configured to rotate and is arranged to extend outwardly from the rotary encoder. The distance from the elongated member to the axis provides a lever arm, which can be used to transfer torque by exerting a force on the elongated member. In the illustrated example, the elongated member extends longitudinally along the axis of rotation of the rotor, but the elongated member may extend outwardly in any combination of longitudinal and radial directions.

FIG. 5c illustrates a complementary solution to that of FIG. 5b. In FIG. 5c, a rotary encoder 50c including a recess 511 is illustrated. The recess is arranged so as to prevent the stator from rotating with respect to an external device when an elongated member fixed to the external device is arranged in the recess. The recess is in this example arranged at a distance from an axis about which the rotor is configured to rotate. Thus, by inserting an elongated member of an external device, the distance from the elongated member to the axis provides a lever arm, which can be used to transfer torque by exerting a force via the elongated member to a wall of the recess.

FIGS. 6a and 6b illustrate rotary encoders having different electromagnetic compatibility aspects.

FIG. 6a illustrates a rotary encoder 60 including a coating 601a on an external surface of the rotary encoder. The external surface may include the second surface of the casting compound of the rotary encoder. According to some aspects, the external surface includes an outer surface of a first housing of the rotary encoder 60. The coating may include a metallic layer, e.g., a metallic thin film, such as an aluminum thin film. According to some aspects, the coating includes a metallic paint. The coating may include metallic nanoparticles.

FIG. 6b illustrates a first housing 619 of a rotary encoder, and the arrangement illustrated in FIG. 6b is complementary to that illustrated in FIG. 6a in the sense that in FIG. 6a the coating 601b is applied on an outside, either of the casting compound or a housing of the rotary encoder (or both). In the example illustrated in FIG. 6b, a coating is applied inside of a first housing 619. The coating may include a metallic layer, e.g., a metallic thin film, such as an aluminum thin film. According to some aspects, the coating includes a metallic paint. The coating may include metallic nanoparticles.

The coatings 601a, 601b of both FIGS. 6a and 6b may be arranged to prevent electrostatic charge and/or discharge from affecting the rotary encoder. According to some aspects, the disclosed coatings are arranged to prevent electromagnetic radiation to and/or from the rotary encoder exceeding a predetermined threshold. According to some further aspects, the coatings are adapted to allow the rotary encoder to function without degradation in the presence of a predetermined electromagnetic disturbance, i.e., to be electromagnetically immune to a predetermined radio frequency interference.

While some of the figures have been limited to illustrate only certain aspects of the rotary encoder and associated methods of manufacture, it is to be understood that technical features disclosed in relation to a certain figure or aspect may be applied to any other aspect, unless explicitly stated that such a combination is impossible. In other words, the features illustrated in relation to FIGS. 1 to 6b may be combined freely, unless stated otherwise.

In some implementations and according to some aspects hereof, the functions or steps noted in the blocks can occur out of the order noted in the operational illustrations. For example, two blocks shown in succession may be executed substantially concurrently or the blocks may be executed in the reverse order, depending upon the functionality and/or acts involved. Also, the functions or steps noted in the blocks can according to some aspects hereof be executed continuously in a loop.

The Figures and description hereof disclose example embodiments of the present invention. However, many variations and modifications may be made to these aspects without substantially departing from the spirit and scope hereof. Thus, the Figures and description should be regarded as illustrative rather than restrictive, and not as being limited to the particular aspects discussed above. Accordingly, although specific terms are employed, they are used in a generic and descriptive sense only and not for purposes of limitation.

The Figures and description of the example embodiments provided herein are presented for purposes of illustration and are not intended to be exhaustive or to limit example embodiments to the precise form disclosed, and modifications and variations are possible and may be acquired from practice of various alternatives to the provided embodiments. The examples discussed herein explain the principles and the nature of various example embodiments and its practical application. The features of the embodiments described herein may be combined in all possible combinations of methods, apparatus, modules, systems, and computer program products. It should be appreciated that the example embodiments presented herein may be practiced in any combination with each other.

It should be noted that the words "a" or "an" preceding a component do not exclude the presence of a plurality of such components. It should further be noted that the example embodiments may be implemented at least in part by both hardware and software, and that several units or devices may be represented by the same item of hardware.

What is claimed is:

1. A rotary encoder, comprising:
   a rotor including a shaft and a first disk, arranged at one end of the shaft and including a scale;
   a stator including a rotation measurement circuit provided on a printed circuit board, the rotation measurement circuit adapted to detect changes in rotational position of the scale relative to the rotation measurement circuit; and
   a casting compound having a first surface facing the stator, the first surface having a first predetermined shape, the first surface and the stator being fixed in relation to each other, the casting compound having a second surface facing away from the stator, the second surface having a second predetermined shape;
   wherein the printed circuit board is at least partially embedded in the casting compound.

2. The rotary encoder according to claim 1, further comprising a first housing having a cavity, the cavity and the second surface being fixed in relation to each other.

3. The rotary encoder according to claim 1, further comprising a housing at least partially enclosing the stator, the housing and the stator being fixed in relation to each other, the housing being arranged between the stator and the casting compound, and the stator and the first surface of the casting compound being fixed in relation to each other by the housing.

4. The rotary encoder according to claim 2, further comprising a second housing at least partially enclosing the stator, the second housing and the stator being fixed in relation to each other, the second housing being arranged between the stator and the casting compound, and the stator and the first surface of the casting compound being fixed in relation to each other by the second housing.

5. The rotary encoder according to claim 1, wherein the rotor is rotatable about an axis with respect to the stator via a set of ball bearings.

6. The rotary encoder according to claim 1, further comprising a rotation-prevention device adapted to prevent the stator from rotating with respect to an external device when the rotation-prevention device is fixed to the external device.

7. The rotary encoder according to claim 6, wherein the rotation-prevention device includes a torque bracket adapted to fix the stator with respect an external device when the torque bracket is fixed to the external device.

8. The rotary encoder according to claim 6, wherein the rotation-prevention device includes an elongated member is arranged at a distance from an axis about which the rotor is rotatable, the elongated member being arranged to extend outwardly from the rotary encoder.

9. The rotary encoder according to claim 1, wherein the rotary encoder includes a recess arranged at a distance from an axis about which the rotor is rotatable, and wherein the recess is adapted to prevent the stator from rotating with respect to an external device when an elongated member fixed to the external device is arranged in the recess.

10. The rotary encoder according to claim 1, further comprising an electrostatic discharge shielding adapted to shield the rotary encoder from electrostatic charge and/or discharge.

11. The rotary encoder according to claim 1, further comprising electromagnetic shielding adapted to prevent electromagnetic radiation to and/or from the rotary encoder exceeding a predetermined threshold.

12. The rotary encoder according to claim 1, wherein the rotary encoder is configured to function without degradation in the presence of a predetermined electromagnetic disturbance.

13. The rotary encoder according to claim 1, further comprising at least one sealing component adapted to seal the rotor from the casting compound.

14. The rotary encoder according to claim 1, further comprising at least one spacer adapted to fix a relative position between two or more components of the rotary encoder.

15. A method for manufacturing a rotary encoder, including a rotor and a stator, the rotor including a shaft and a first disk, arranged at one of the shaft and including a scale, the stator including a rotation measurement circuit provided on a printed circuit board, the rotation measurement circuit adapted to detect changes in rotational position of the scale relative to the rotation measurement circuit, comprising:
arranging the stator in an internal space of a housing; and
filling a residual space of the internal space, between the stator and the housing, with a casting compound, the casting compound having a first surface facing the stator, the first surface having a first predetermined shape, the first surface and the stator being fixed in relation to each other, the casting compound having a second surface facing away from the stator, the second surface having a second shape determined by the internal space of the housing, the printed circuit board being at least partially embedded in the casting compound.

16. The method according to claim 15, further comprising arranging at least one sealing components, adapted to seal the rotor from the casting compound, at the rotary encoder.

17. The method according to claim 15, further comprising arranging at least one spacer, adapted to fix a relative position between two or more components of the rotary encoder, at the rotary encoder.

18. The method according to claim 15, further comprising arranging a rotation-prevention device, adapted to fixate the stator with respect an external device when the rotation-prevention device is fixed to the external device, at the rotary encoder.

19. A method for manufacturing a rotary encoder, including a rotor and a stator, the rotor including a shaft and a first disk, arranged at one of the shaft and including a scale, the stator including a rotation measurement circuit provided on a printed circuit board, the rotation measurement circuit adapted to detect changes in rotational position of the scale relative to the rotation measurement circuit, comprising:
arranging the stator in an internal space of a housing; and
filling a residual space of the internal space, between the stator and the housing, with a casting compound, the casting compound having a first surface facing the stator, the first surface having a first predetermined shape, the first surface and the stator being fixed in relation to each other, the casting compound having a second surface facing away from the stator, the second surface having a second shape determined by the internal space of the housing, the printed circuit board being at least partially embedded in the casting compound;
wherein the rotary encoder is arranged as recited in claim 1.

20. A rotary encoder, comprising:
a rotor including a shaft and a first disk, arranged at one end of the shaft and including a scale;
a stator including a rotation measurement circuit provided on a printed circuit board, the rotation measurement circuit adapted to detect changes in rotational position of the scale relative to the rotation measurement circuit; and
a casting compound having a first surface facing the stator, the first surface having a first predetermined shape, the first surface and the stator being fixed in relation to each other, the casting compound having a second surface facing away from the stator, the second surface having a second predetermined shape;
wherein the printed circuit board is at least partially embedded in the casting compound; and
wherein the rotary encoder is manufactured according to the method recited in claim 19.

* * * * *